United States Patent [19]
Proske

[11] Patent Number: 5,201,407
[45] Date of Patent: Apr. 13, 1993

[54] STEEL PLATE CONVEYOR WITH DRIVE

[75] Inventor: Hans Proske, Reinheim, Fed. Rep. of Germany

[73] Assignee: Carl Schenck AG, Fed. Rep. of Germany

[21] Appl. No.: 916,203

[22] Filed: Jul. 17, 1992

[30] Foreign Application Priority Data

Nov. 14, 1991 [EP] European Pat. Off. ........ 91119467.8

[51] Int. Cl.⁵ .............................................. B65G 23/14
[52] U.S. Cl. .................................. 198/833; 198/842; 198/851; 198/853
[58] Field of Search ............... 198/833, 842, 851, 853, 198/321, 328

[56] References Cited

U.S. PATENT DOCUMENTS

| | | | |
|---|---|---|---|
| 1,973,750 | 9/1934 | De Kay | 198/853 X |
| 3,185,108 | 5/1965 | Muller | 198/321 |
| 3,379,300 | 4/1968 | Karr | 198/833 |
| 3,410,390 | 11/1968 | Peterson | 198/833 X |
| 3,493,097 | 2/1970 | Karr | 198/833 X |
| 3,498,445 | 3/1970 | Pipeo | 198/833 |
| 3,682,295 | 2/1972 | Roinestad | 198/833 |
| 3,777,877 | 12/1973 | Piper | 198/833 |
| 3,877,567 | 4/1975 | Sommerfield | 198/833 |
| 3,881,592 | 5/1975 | Stimpson | 198/852 |
| 5,042,648 | 8/1991 | Garvey | 198/833 X |

FOREIGN PATENT DOCUMENTS

| | | |
|---|---|---|
| 0191116B1 | 8/1986 | European Pat. Off. . |
| 0191116A1 | 8/1986 | European Pat. Off. . |
| 8535683.2 | 4/1986 | Fed. Rep. of Germany . |
| 20884980 | 7/1972 | France . |

Primary Examiner—Robert P. Olszewski
Assistant Examiner—Cheryl L. Gastineau
Attorney, Agent, or Firm—Connolly & Hutz

[57] ABSTRACT

A curve traveling steel plate conveyor comprises a plurality of conveyor plates with a series of interconnecting chain links flexibly interconnecting the conveyor plates. Structure is provided for guiding the conveyor plates over a path of travel that includes a curved segment. A drive for the conveyor plates includes a driven conveyor belt below the conveyor plates in frictional engagement with the conveyor plates at least over a selected portion of the path of travel of the steel plate conveyor.

4 Claims, 4 Drawing Sheets

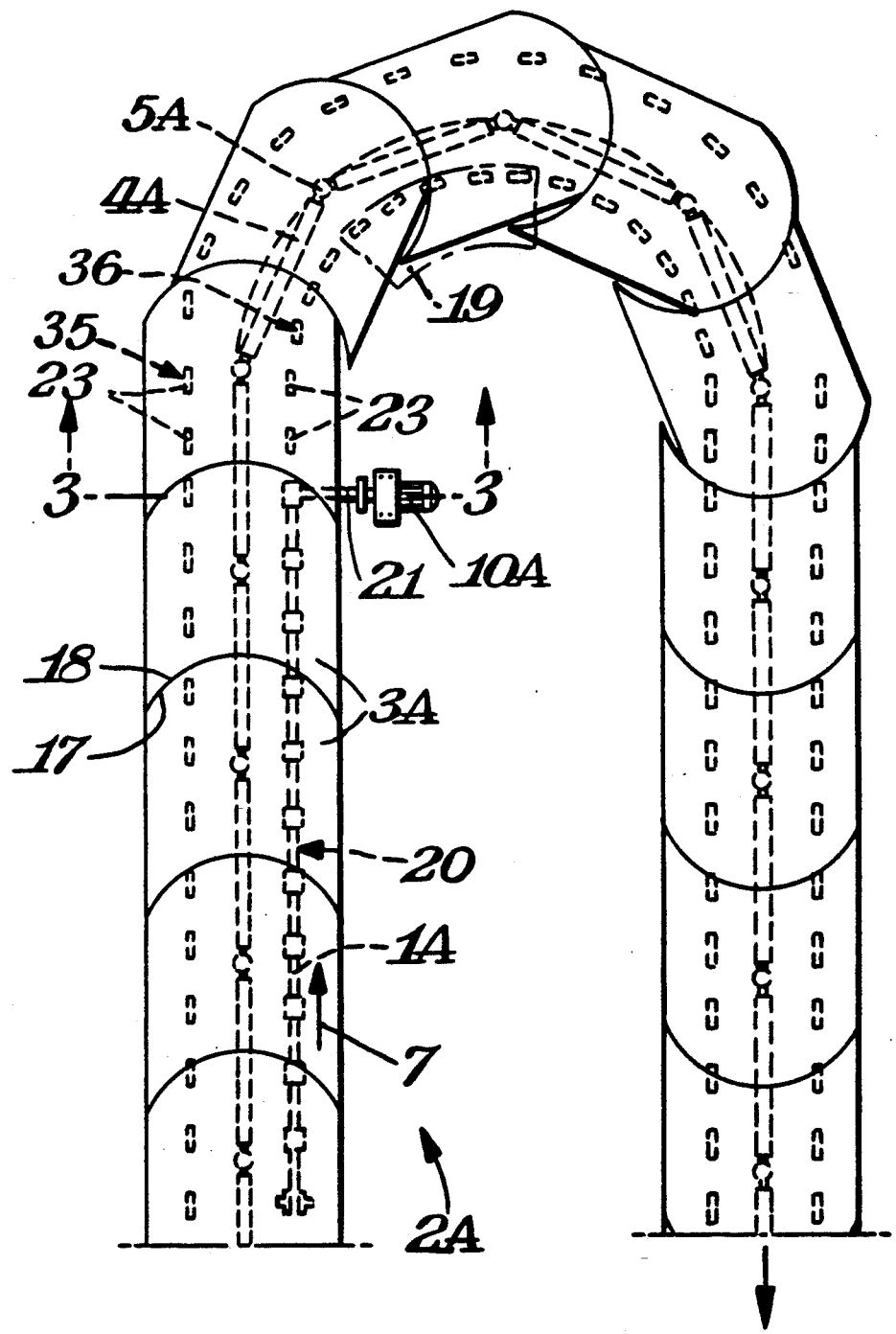

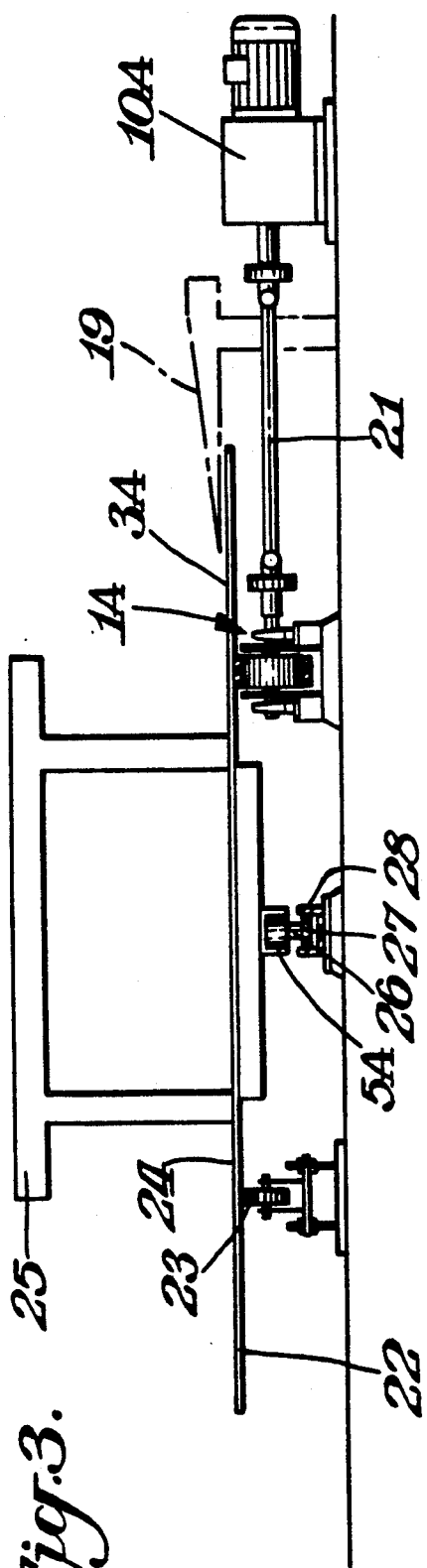
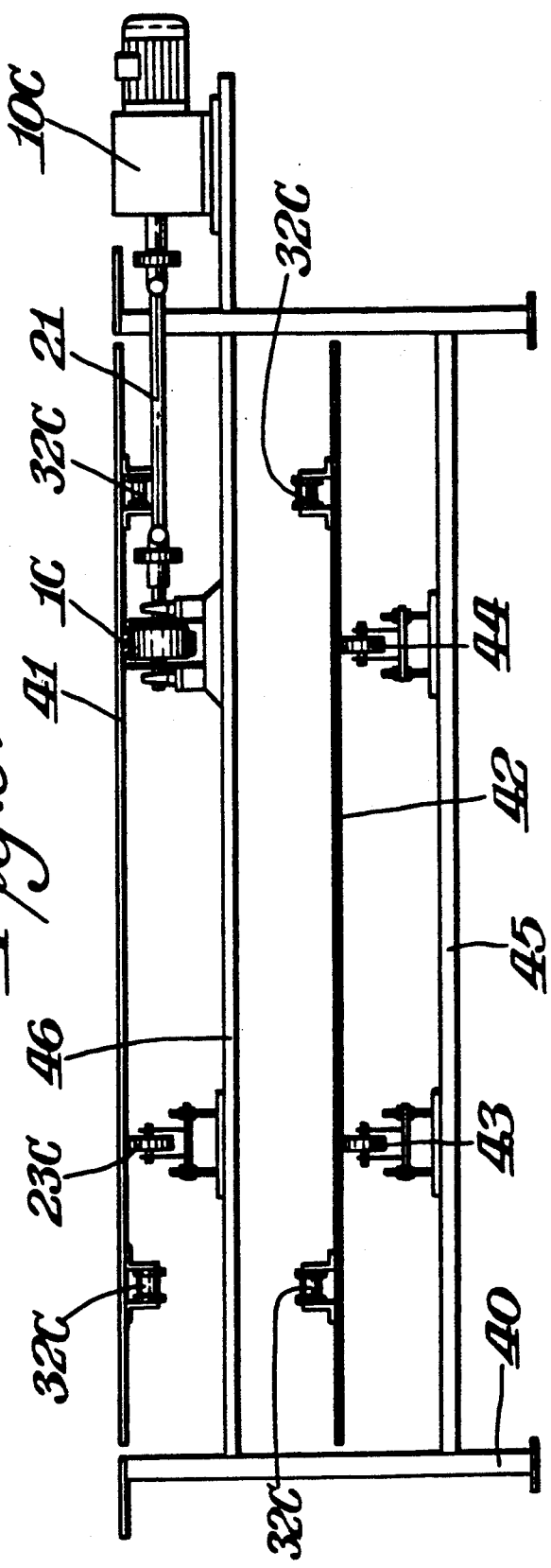

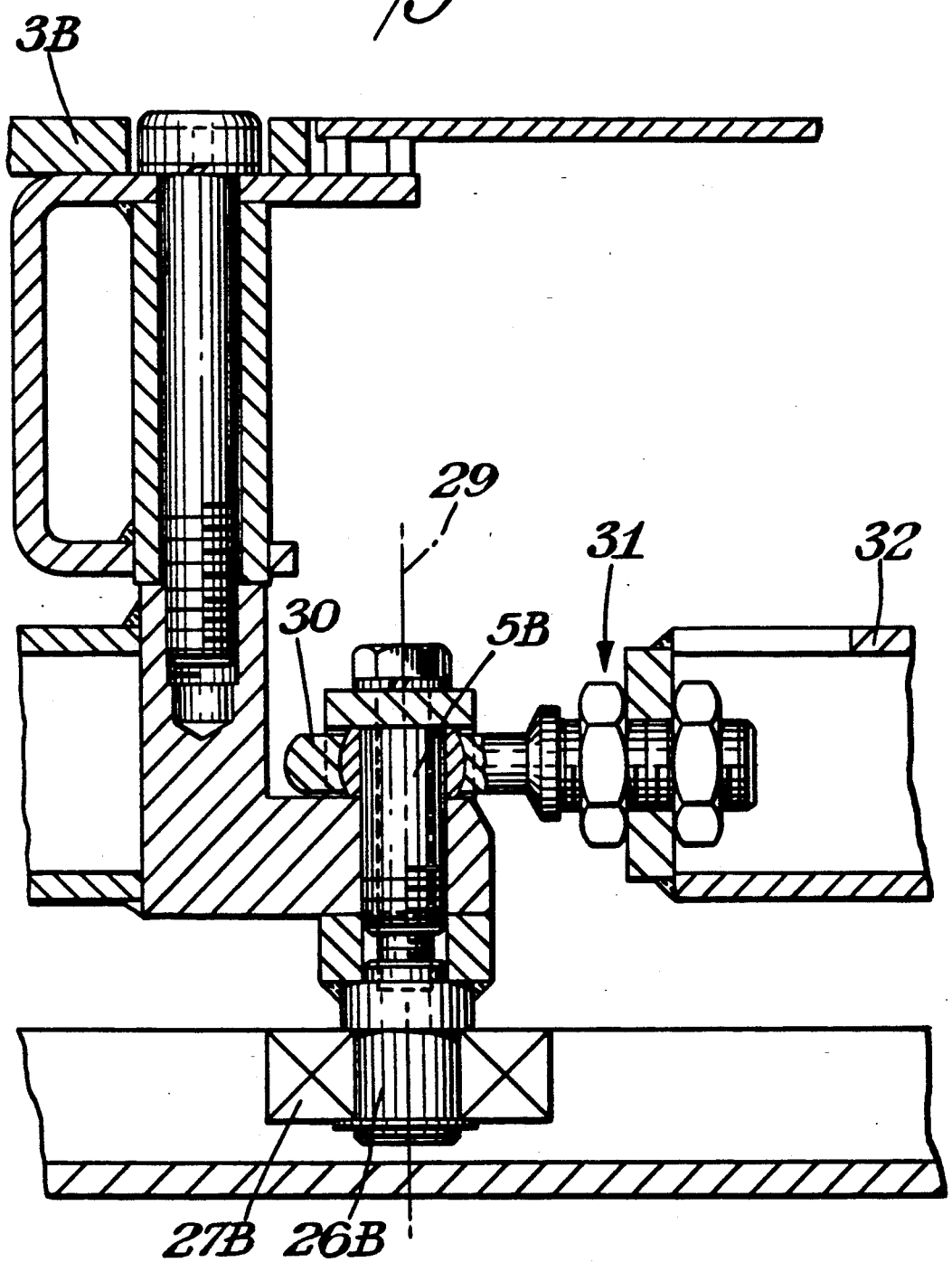

STEEL PLATE CONVEYOR WITH DRIVE

BACKGROUND OF THE INVENTION

The present invention relates to a steel plate conveyor, and more particularly to a steel plate conveyor with a drive having a curved conveyor path portion and wherein the individual conveyor plates are flexibly connected by chain links.

When components are assembled consisting of several construction elements, steel plate conveyors traveling along a curved path are often used which are designed, for example, as a continuous conveyor running along an oval path. It is then possible to position various assembly stations adjacent to each other corresponding to the production progress of the component. The same applies to the dismantling of components consisting of numerous elements or to the distributing and sorting of piece goods. Here, too, there are generally sorting stations or unloading stations along a plate conveyor traveling along a curved path, which leads back to its starting point or to its loading station so that, at the end of the distribution process, the empty plate conveyor can once again be loaded with goods to be distributed or sorted. The same applies to the assembly of components consisting of several constructions elements, for example, vehicle engines. In that case, at the end of the assembling operation, the completed engine is taken away from the plate conveyor, while immediately behind it, the first basic element for a new engine to be assembled is placed on the curve traveling steel plate conveyor.

The drive for such steel plate conveyors generally consists of drive chains which mesh with gear wheels and which generally extend along the entire length of the steel plate conveyor. Such drives are known to be very noisy, prone to malfunctioning, and they demand a great deal of maintenance. Moreover, the constantly changing form-fit between the chain wheel and the chain, even if the chain is plastic-coated, for example, requires constant lubrication, which causes the system as well as the goods being conveyed to become dirty. The wear and tear of such plate conveyor drives is quite severe. Furthermore, such drives cannot be used to support the conveyor plates, but rather, there is also a need, for example, for parallel roller trains positioned below the individual conveyor plates in the conveying direction, on which the conveyor plates constituting the curve traveling plate conveyor are supported.

German Utility Model No. 85 35 683 discloses a conveying device with driven armored belts to transport loaded pallets, in which armored conveyor belts are arranged parallel and next to each other over the entire conveying segment in such a way that the loaded pallets to be conveyed rest on these belts and are transported over the entire conveying segment. Moreover, European Patent Application No. 01 91 116 describes a drive for pallets in which the pallets are driven in a drive station by means of a compression drive which interacts with a pressure pad. Such drives cannot be reliably used for curve traveling plate conveyors. Moreover, if the friction surface of the pallet is dirty, then the belt can no longer be reliably driven due to the loss of friction.

SUMMARY OF THE INVENTION

In accordance with the present invention, the drive of a plate conveyor does not display the wear and tear associated with form-fit components, and its operation is generally free of noise. Moreover, the conveyor construction does not require additional auxiliary devices to support the plates, even during maintenance. The bottom of the plate conveyor is frictionally engaged with a driven belt conveyor along part of its conveying path. This inventive solution according to which only part of the conveying path is frictionally engaged with the bottom of the plate conveyor solves the problem upon which the invention is based. In the case of a horizontally positioned curve traveling steel plate conveyor, the individual chain links which flexibly connect the conveyor plates may be frictionally engaged with a belt conveyor. The drive and deflection rollers of the belt conveyor have vertical axes and the driven belt conveyor extends in a horizontal direction. Thus, it also becomes possible to drive the curve traveling steel plate conveyor only in its curved segment and to effectuate the drive at such curved segment by means of friction.

Moreover, when the running direction of the belt conveyor is changed, an increased braking effect is achieved which has not been possible with the drives used heretofore for steel plate conveyors.

In the present conveyor construction, and particularly in the segment where the components are frictionally engaged, the bottom of the steel plate conveyor rests on the driven belt conveyor. The result is that in the steel plate conveyor path and also in the straight segment of a curve traveling steel plate conveyor, it is possible to achieve practically soundless driving as well as practically soundless braking of such conveyors. Also, as a result of the extension over only one specific segment of the conveyor path, monitoring and maintenance of the conveyor drive is very easy.

As a further embodiment of the invention, particularly, for vertically running steel plate conveyors and also for wide, curve traveling steel plate conveyors, when the bottom of the plate conveyor rests on two supports which are parallel to each other in the conveying direction, preferably one row is designed as a support which does not hinder the movement of the plate conveyor in the conveying direction. The other row has a segment in its path which is replaced by a driven belt conveyor frictionally engaged with the bottom of the plate conveyor. This achieves a considerable simplification and reduction in cost of the drive of such steel plate conveyors, and if necessary, the drive can be tightened without a prolonged standstill of this conveying device such was not possible without a great deal of effort and readjustment in the case of the drives described in the prior art.

In another embodiment of the present invention, the conveyor plates of the curve traveling steel plate conveyors are guided in a horizontal direction by the flexibly connected chain links along guides which run in the conveying direction. The guidance is effectuated in the vertical direction in the drive segment by the driven belt conveyor and by the associated supports of the other side. This embodiment brings about an additional increase in the friction. Specifically, in the drive segment, the individual plate elements increase the friction as a result of their weight.

In still another embodiment of the invention, the flexibly connected chain links are guided by the legs of a U-shaped rail at a distance from its web by means of rollers positioned at the chain links. As a result of this embodiment, when maintenance work becomes necessary, no additional auxiliary devices are needed to support the conveyor plates or the chain links. Instead, when the belt conveyor is removed, the individual conveyor plates support the unit of chain links and conveyor plates via the chain links without any need for any additional support. The chain links then rest on the web of the U-shaped rail. This is also the case, for example, when a conveying platform is used instead of the belt conveyor.

Therefore, the invention makes it possible to drive especially curve traveling steel plate conveyors at the place that is most convenient for maintenance, so that this drive can also be taken out without any problem in case of maintenance work, without any need of any additional braking installations. The frictionally engaged connection over a segment of the conveying path of the conveyor also serves as the holding device during times of standstill.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawing wherein similar reference characters refer to similar parts and in which:

FIG. 2 is a top plan view of another plate conveyor with a drive in the straight segment of its conveying path, according to the present invention;

FIG. 3 is a cross-sectional view substantially taken along line 3—3 of FIG. 2;

FIG. 4 is a cross-sectional view through a chain constructed and arranged to flexibly connect the conveyor plates; and FIG. 5 is a cross-sectional view through a vertically running steel plate conveyor with drive.

DETAILED DESCRIPTION OF THE INVENTION

Figure 1:
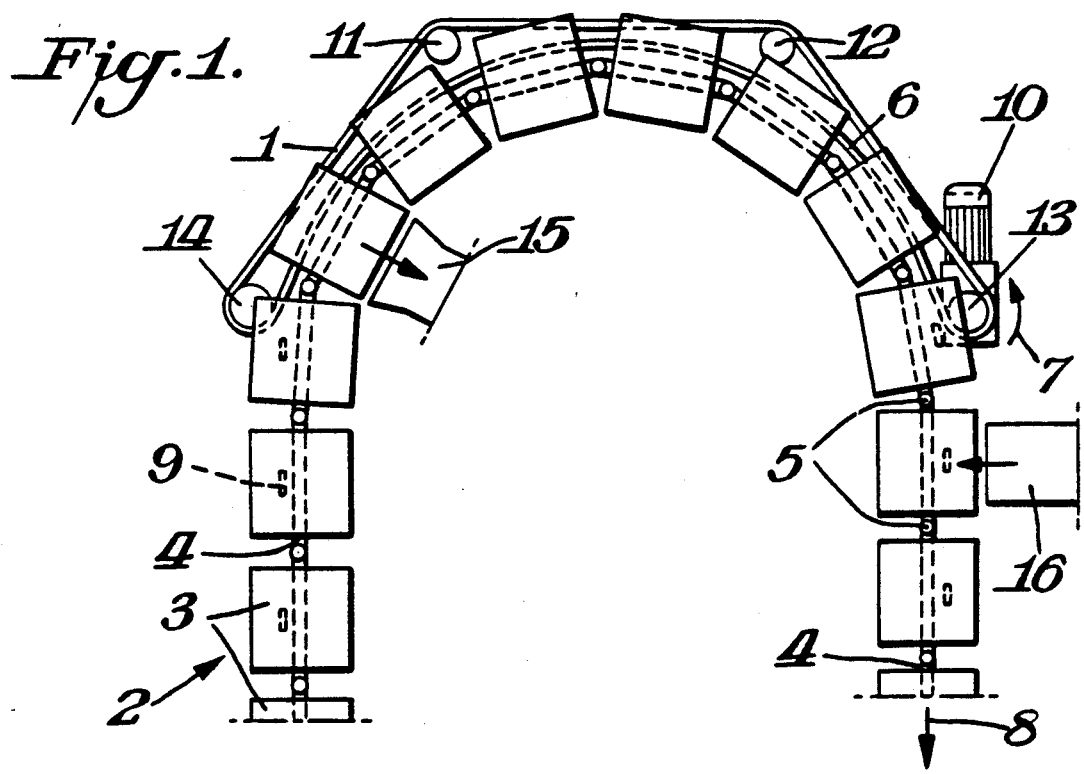
FIG. 1 is a top plan view of a plate conveyor and a drive therefor in the curved portion of its path of travel, according to the present invention.

Referring in more particularity to the drawings, FIG. 1 shows a belt conveyor 1 for driving a steel plate conveyor 2 in the area of its curved path of travel. The steel plate conveyor 2 consists of individual conveyor plates 3 which are sufficiently spaced from each other so that they never touch one another even along the curved portion of their path of travel. The individual conveyor plates 3 are joined to chain links 4 which are flexibly connected to each other at hinge points 5 located between the chain links. The hinge points 5 also guide the steel plate conveyor 2, for example, in a U-shaped rail, shown in FIG. 3, for example.

In the curved segment of the belt conveyor 1, one of the legs of the U-shaped rail is replaced by the returning belt 6 of the belt conveyor 1, so that, when the belt conveyor 1 moves in the direction of the arrow 7, the steel plate conveyor 2 is carried along in the direction of the arrow 8 via the hinge points 5.

Instead of the carrying of the steel plate conveyor 2 in the area of the hinge points 5, it is also possible to have carriers 9 facing in a vertically downward direction and located off-center on the bottom of the individual conveyor plates 3. These carriers are engaged in operative connection with the returning belt 6.

By reversing the drive direction in the drive motor 10 of the belt conveyor 1, the steel plate conveyor 2 is braked within a very short period of time. At the same time, additional deflection rollers 11, 12 can be used as tension rollers, which makes it possible to change the initial tension in the belt conveyor 1 during the transport of goods, especially piece goods, on the steel plate conveyor 2. In the embodiment shown in FIG. 1, the axes of the drive roller 13 and the deflection roller 14 as well as the axes of the additional deflection rollers il, 12 are arranged in a vertical direction for a rubber belt conveyor running in a horizontal plane.

The rubber belt conveyor has a last unloading station 15 as well as a first loading station 16. The individual conveyor plates 3 are easily cleaned, for example, in the space between the unloading station 15 and the loading station 16.

It is also possible to position a steel plate conveyor 2 over several stories so that, in spite of the fact that the drive is effectuated over only a certain segment by means of a frictionally engaged connection between the belt conveyor 1 and the steel plate conveyor 2, steep inclines can be overcome.

However, instead of an unloading station 15 and a loading station 16 of the type which are shown, it is also possible to carry out automatic loading onto the steel plate conveyor 2 and to carry out automatic unloading from the steel plate conveyor 2 in accordance with prescribed information about the piece goods.

The steel plate conveyor 2A shown in FIG. 2 has conveyor plates 3A, which are directly adjacent to each other, whereby a convex front edge 17 of one conveyor plate 3A fits into a concave back edge 18 of the preceding conveyor plate 3A. When a component consisting of several elements is assembled, this arrangement prevents any attachment parts from falling between the individual conveyor plates 3A and it prevents parts which could damage the drive of the steel plate conveyor 2A from protruding between the individual conveyor plates 3A. Due to the convex-concave fit of the individual conveyor plates 3A, a curve traveling path is achieved in a plane, and a hindrance of the operation of the steel plate conveyor 2A is avoided by installing an apron 19 in the area of the deflection.

The drive is located on a straight piece 20 of the steel plate conveyor 2A. This drive consists of a drive motor 10A, which drives a belt conveyor 1A via a flexible shaft 21 which runs in the direction of arrow 7. Instead of the belt conveyor 1A, it is also possible to have a conveying device consisting of reinforced rubber belts which, in turn, rest on a base all the way around the conveyor plates. The top is frictionally engaged with the bottom 22 (see FIG. 3) of the conveyor plates 3A.

In the case of the embodiment of FIG. 2, the bottom of the plate conveyor belt 22 rests on the driven belt conveyor 1A in the area of the drive.

Hinge points 5A are located on the bottom of the steel plate conveyor 2A in the middle of each conveyor plate 3A. The hinge points are connected to each other with chain links 4A for guiding the curve traveling plate conveyor.

As shown schematically in FIG. 2, the steel plate conveyor 2A is supported by two rows 35, 36 of support rollers 23 positioned one behind the other in such a way that the steel plate conveyor 2A rolls on these rollers. Only in the driven segment of the belt conveyor 1A are the support rollers 23 of row 36 replaced by the belt conveyor. Thus, the belt conveyor 1A simultaneously takes over the function of the support rollers 23 which was not possible with conveyor drives used heretofore. Similar to the belt conveyor 1 shown in FIG. 1, the belt conveyor 1A can likewise serve to brake the steel plate conveyor 2A and it also ensures that there is a firm holding of the conveyor belt as a result of frictionally engagement when the drive motor 10A is replaced.

FIG. 3 shows a cross-section through the conveyor plate 3A whose bottom 22 rests on a support roller 23 and is frictionally engaged with the belt conveyor 1A.

On the top 24 of the plate conveyor 3A an assembly 25 is shown, on which a part to be mounted is assembled as it is moved past individual work stations by means of the curve traveling steel plate conveyor 2A.

On the bottom 22 of the plate conveyor belt 3A starting at the hinge point 5, a stub shaft 26 is provided which extends in a vertically downward direction and which has a guide roller 27 at its lower end. In the embodiment of FIG. 3, the guide roller 27 moves in a U-shaped rail 28, as shown.

In its drive segment, the belt conveyor 1A replaces the support rollers 23 which otherwise run parallel to each other.

If the drive motor 10A and the flexible shaft 21 are dismantled, the belt conveyor can be taken out, for example, by lowering it below the steel plate conveyor 2A without a need for any additional support for the conveyor plates 3A present in this area. The vertical shaft 26 supports each conveyor plate 3A on the bottom of the U-shaped rail 28. Thus, for maintenance purposes or repair work, only the parts to be serviced or replaced must be removed, without the entire steel plate conveyor having to be dismantled.

The cross-sectional view shown in FIG. 4 illustrates a simplified version of a vertical articulated axle 29 which runs through the hinge point 5B and which is, at the same time, the axle of the vertical shaft 26B, at whose lower end the guide roller 27B is located.

The hinge point 5B is stationary, and it is positioned so as to be in alignment with the conveyor plate 3B. The next conveyor plate is then held by the vertical shaft 26B via a head piece 30 in such a way that it can rotate freely and, by means of an adjustment mechanism 31, it is connected by a rigid chain link 32 to the next conveyor plate 3B, which also has a hinge point 5B in its middle portion in such a way that a pronounced movement of the convex-concave surfaces of the individual conveyor plates 3B positioned one behind the other is achieved.

The cross-sectional view shown in FIG. 5 through a vertically running steel plate conveyor with a drive is positioned on a frame 40 forming a crosshead. The advancing belt 41 of the steel plate conveyor is driven by the motor 10C via the flexible shaft 21 and the belt conveyor 1C via a segment of the advancing belt on its bottom, while otherwise the advancing belt 41 rests on the support rollers 23.

The individual conveyor plates are connected via the rigid conveying links 32C. As a result, a circular steel plate conveyor is created which runs vertically, whereby the two deflection sites (not shown here) must be installed between the advancing belt 41 and the returning belt 42 only as tension sites and no longer as a tension site and a drive site. In the returning belt 42, the steel plate conveyor with its rigid chain links 32C rests on support rollers 43, 44 which are located on a crossbeam 45 of the frame 40. The support rollers 23 for the advancing belt 41 and the belt conveyor 1C rest on a beam 46.

Due to the drive of the steel plate conveyor by means of the belt conveyor in the advancing belt, as already mentioned, what used to be the drive wheel for the steel plate conveyor now becomes purely a deflection wheel for the steel plate conveyor. Thus, at the same time, the jerky drive of the steel plate conveyor is eliminated as a result of the polygonal course of the steel plate conveyor as it is driven via the drive wheel. This jerky movement of the steel plate conveyor occurred especially because of the unavoidable slack between the chain links when the steel plate conveyor was driven further forward, first taking up the slack. However, if the steel plate conveyor is only deflected via the deflection wheels (not shown), which can also be designed as tension stations, smooth transport is achieved since individual plates of the steel plate conveyor rest on the belt conveyor thereby also eliminating the wear and tear of the rigid chain links resulting from the drive.

What is claimed is:

1. A curve traveling steel plate conveyor comprising a plurality of conveyor plates, a series of interconnected chain links flexibly interconnecting the conveyor plates, means guiding the conveyor plates over a path of travel that includes a curved segment, a drive including a driven conveyor belt below the conveyor plates in frictional engagement with the conveyor plates at least over a selected portion of the path of travel of the steel plate conveyor, and support means for the conveyor plates positioned below the plates and extending along the path of travel of the steel plate conveyor, the support means having one line of spaced apart rollers in engagement with the conveyor plates and a second line of support rollers generally parallel to the first line, and the second line including an interrupted portion where the conveyor belt is positioned.

2. A curve traveling steel plate conveyor as in claim 1 wherein each of the conveyor plates has a bottom surface in frictional engagement with the driven conveyor belt over the selected portion of the path of travel of the steel plate conveyor.

3. A curve traveling steel plate conveyor as in claim 1 wherein the means guiding the conveyor plates over the path of travel includes a stationary U-shaped guide rail positioned below the conveyor plates and extending along the path of travel, and hinge points along the chain links having portions that extend into the U-shaped guide rail.

4. A curve traveling steel plate conveyor as in claim 3 wherein the hinge point portions that extend into the U-shaped guide rail each include a rotatably mounted roller engaging opposite leg of the U-shaped rail and spaced upwardly a slight distance from a bottom web of the U-shaped rail.

* * * * *